(12) United States Patent
Scharf

(10) Patent No.: US 6,179,074 B1
(45) Date of Patent: Jan. 30, 2001

(54) ICE SHANTY MOVER

(76) Inventor: David Scharf, 9048 Hull La. Dr., Greenville, MI (US) 48838

( * ) Notice: Under 35 U.S.C. 154(b), the term of this patent shall be extended for 0 days.

(21) Appl. No.: 09/182,558

(22) Filed: Oct. 29, 1998

(51) Int. Cl.[7] .................................................. B62M 7/14
(52) U.S. Cl. ............................ 180/11; 180/15; 180/19.1
(58) Field of Search .................................. 180/19.1, 19.3, 180/19.2, 16, 15, 11, 12, 13; 280/19.1

(56) References Cited

U.S. PATENT DOCUMENTS

| | | |
|---|---|---|
| 1,335,461 | 3/1920 | Rundall . |
| 2,239,122 * | 4/1941 | Stokes ...................................... 180/19 |
| 2,450,566 | 10/1948 | Schmid ...................................... 180/6 |
| 3,419,095 | 12/1968 | Hood ...................................... 180/6 |
| 3,651,880 | 3/1972 | Hatch et al. .......................... 180/6 R |
| 3,750,776 * | 8/1973 | Stevenson ............................... 180/6 |
| 3,750,777 * | 8/1973 | Thompson ............................... 180/6 |
| 5,339,916 * | 8/1994 | Louis ................................... 180/19.3 |
| 5,388,850 * | 2/1995 | Simone ............................... 280/442 |
| 5,439,069 * | 8/1995 | Beeler ................................... 180/11 |

* cited by examiner

*Primary Examiner*—Kevin Hurley
(74) *Attorney, Agent, or Firm*—Van Dyke, Gardner, Linn & Burkhart, LLP

(57) ABSTRACT

An ice shanty mover includes a frame on which a motor and traction wheel are mounted. A series of chains and gears connect the traction wheel to the motor such that the traction wheel rotates when the motor is activated. A control cable extends forwardly from the motor to allow a user to control the speed of the motor while walking in front of the ice shanty. A front plate on the ice shanty mover engages a skirt on the ice shanty and pushes against the skirt causing the shanty to move. Steering is accomplished by a tow rope attached to either the shanty or the shanty mover.

20 Claims, 4 Drawing Sheets

ICE SHANTY MOVER

BACKGROUND OF THE INVENTION

1. Field of the Invention

This invention generally relates to ice shanties, and in particular, to devices for moving ice shanties.

2. Description of the Prior Art

The sport of ice fishing is often enjoyed by taking advantage of ice shanties. Ice shanties provide privacy and a certain protection against the elements to ice fishermen. Ice shanties come in a variety of different shapes and sizes. Some ice shanties are designed to accommodate multiple users, while other shanties are smaller and only can accommodate a single user. Moreover, some ice shanties are fixed structures, while other ice shanties can be raised and collapsed in a manner similar to a tent.

In order to enjoy the advantages of ice shanties, it is of course necessary to move the ice shanty to the desired location of the frozen lake or other body of water. It may also be desirable to move the shanty to different locations on the frozen lake depending on the success in fishing, weather changes, and the relative thickness of the ice. After the user has finished ice fishing, the ice shanty must also be moved back to shore. The movement of the ice shanty can often be a tiresome and challenging task. This task is often aggravated by inclement weather, along with the build up of snow on the frozen lake. In the past, this tiresome task of moving the ice shanty is often been ameliorated by towing or pushing the ice shanty with a snowmobile or automobile. These two techniques, however, are problematic because they can only be employed when the ice is thick enough to support the heavy weight of a snowmobile or automobile. In the past, therefore, an ice fisherman who desired to fish when the ice was not thick enough to support a heavy vehicle was forced to tow his or her ice shanty by hand. As mentioned, this can be an extremely challenging task. Accordingly, it would be desirable to provide an easy and convenient method for moving an ice shanty which could be implemented when the ice is not thick enough to support an automobile or snowmobile.

SUMMARY OF THE INVENTION

The present invention provides an ice shanty mover which enables an ice shanty to be easily moved across icy or snowy surfaces. The ice shanty mover of the present invention is relatively lightweight and therefore can be used during times when the ice is not thick enough to support a heavy vehicle.

An ice shanty mover according to one aspect of the present invention includes a frame on which a motor and a traction wheel are mounted. A chain connects the motor to the traction wheel such that the traction wheel rotates when the motor is activated. A control cable is attached to the motor and includes a hand grip at an end opposite the motor. The length between the motor and the hand grip is sufficient to extend from the motor to the front of the ice shanty so that a person walking in front of the ice shanty can grasp the handle. The control cable allows a person to control the speed of the motor. The ice shanty mover further includes an ice shanty engaging plate which is adapted to selectively abut against the ice shanty and push the ice shanty when the traction wheel rotates.

The ice shanty mover of the present invention provides a lightweight, easy to use method for moving ice shanties. Moreover, the ice shanty mover of the present invention is detachable from the ice shanty, can be used to push multiple shanties, is compact enough to be easily stored and light enough to be easily carried. These and other benefits, results, and objects of the present invention will be apparent to one skilled in the art, in light of the following specification when read in conjunction with the accompanying drawings.

BRIEF DESCRIPTIONS OF THE DRAWINGS

DETAILED DESCRIPTION OF THE PREFERRED EMBODIMENTS

Figure 1:
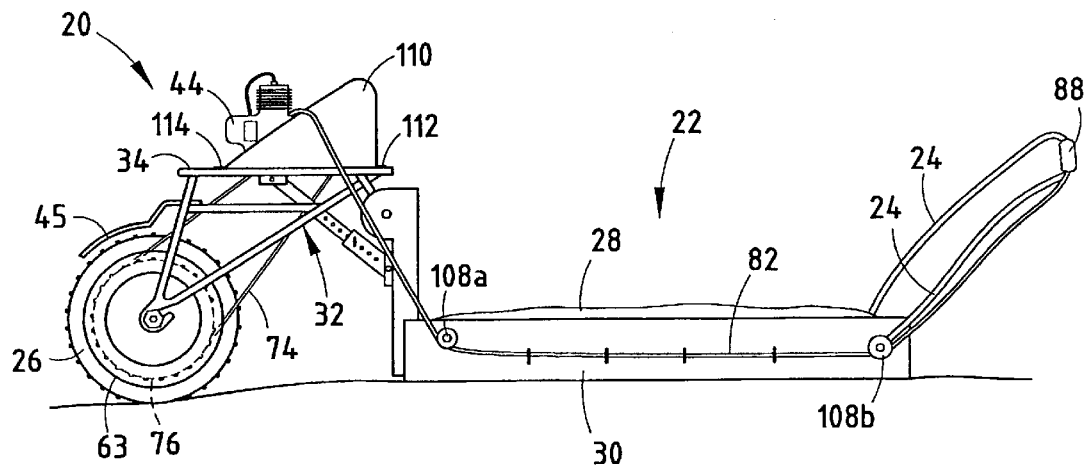
FIG. 1 is a side, elevational view of an ice shanty mover according to one embodiment of the present invention illustrated attached to a folded-down ice shanty.

The present invention will now be described with reference to the accompanying drawings wherein like reference numerals correspond to like elements in the several drawings. An ice shanty mover 20 is depicted in FIG. 1 shown attached to an ice shanty 22. Ice shanty 22 is a collapsible ice shanty and can be setup and folded down in a manner similar to a tent. Ice shanty 22 includes a rigid, outer skirt 30 which surrounds an interior tent-like structure 28 where the fabric fits when the shanty is disassembled. In order to move ice shanty 22, ice shanty mover 20 is placed at one end of the ice shanty. Ice shanty mover 20 includes a front plate 48 which is adapted to engage skirt 30 in a manner described in more detail below. Ice shanty mover 20 further includes a traction wheel 26 which engages the ground and provides the motive force for moving ice shanty 22. When using ice shanty mover 20, the user walks in front of ice shanty 22 and steers the movement of the ice shanty by way of a tow cable or rope 24 attached to either ice shanty 22 or ice shanty mover 20. By pulling toward the right or left on tow cable 24, ice shanty 22 can be steered while being pushed by ice shanty mover 20. Tow cable 24 includes a handle 88 to which a control switch 100 is attached. Control switch 100 is in communication with a motor 44 on ice shanty mover 20 by way of a throttle or control cable 82. Control switch 100 allows a user to control the speed of movement of ice shanty mover 20.

Figure 2:
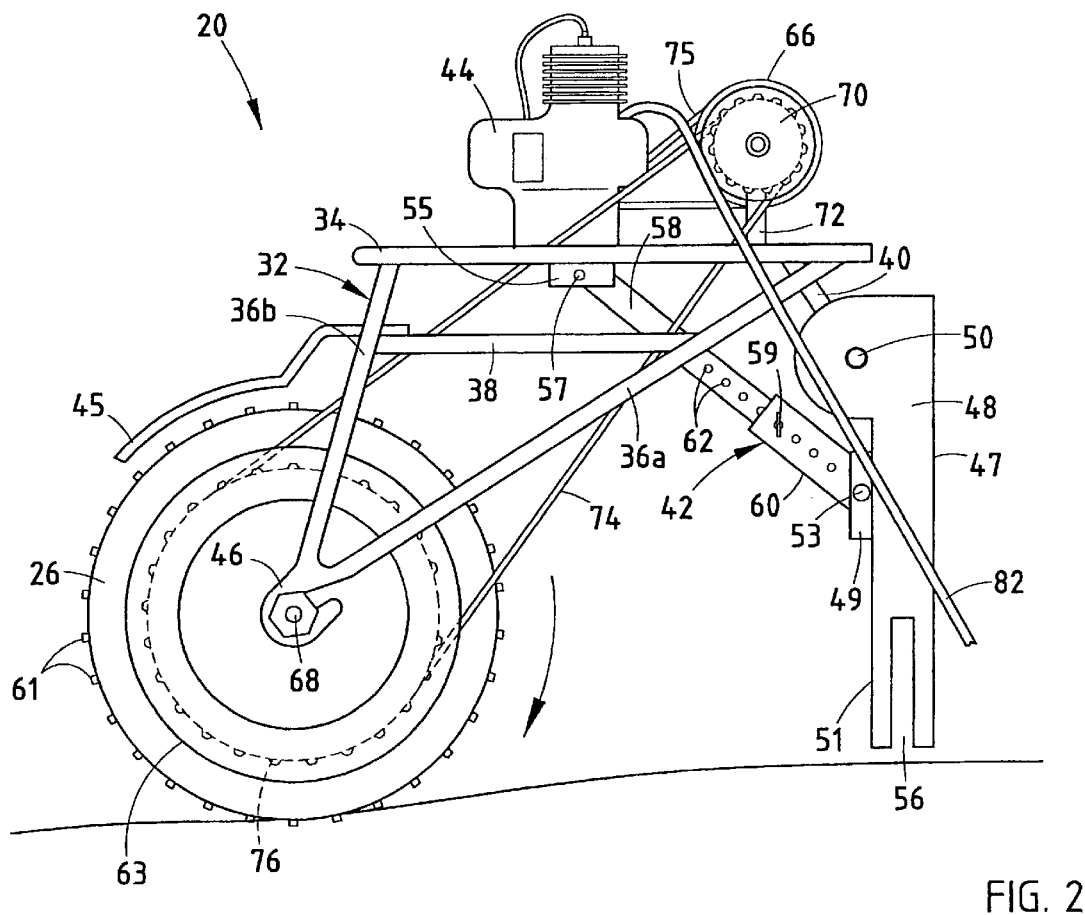
FIG. 2 is a side, elevational view of the ice shanty mover of FIG. 1 illustrated without a top cover.
Figure 3:
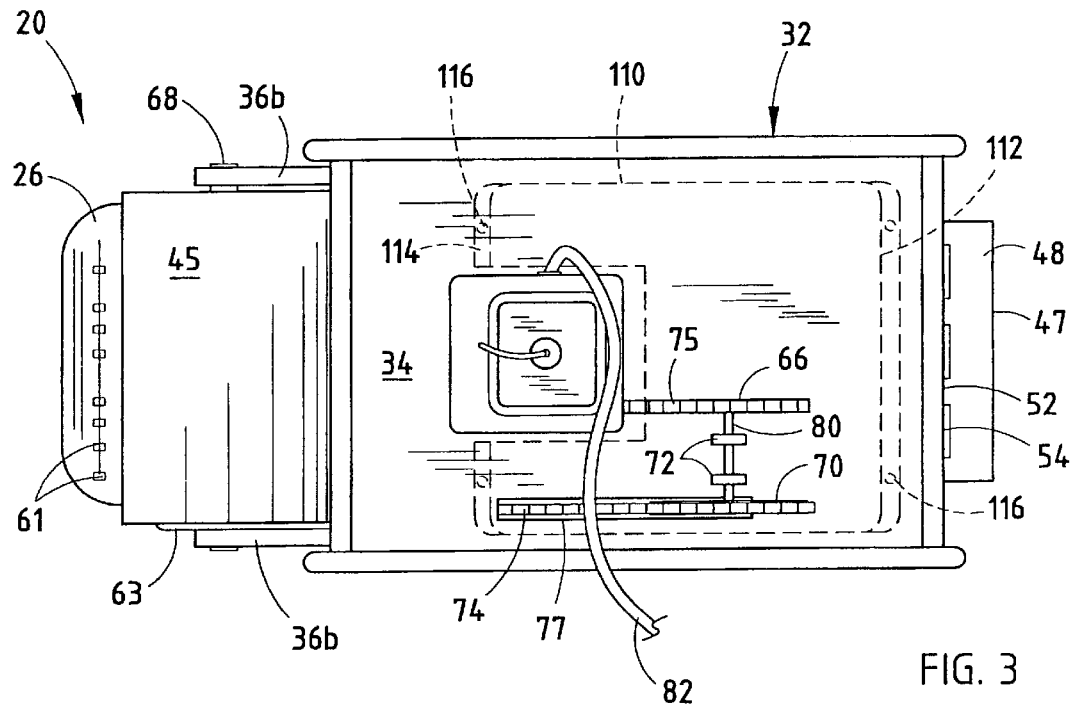
FIG. 3 is a plan view of the ice shanty mover of FIG. 2.
Figure 4:
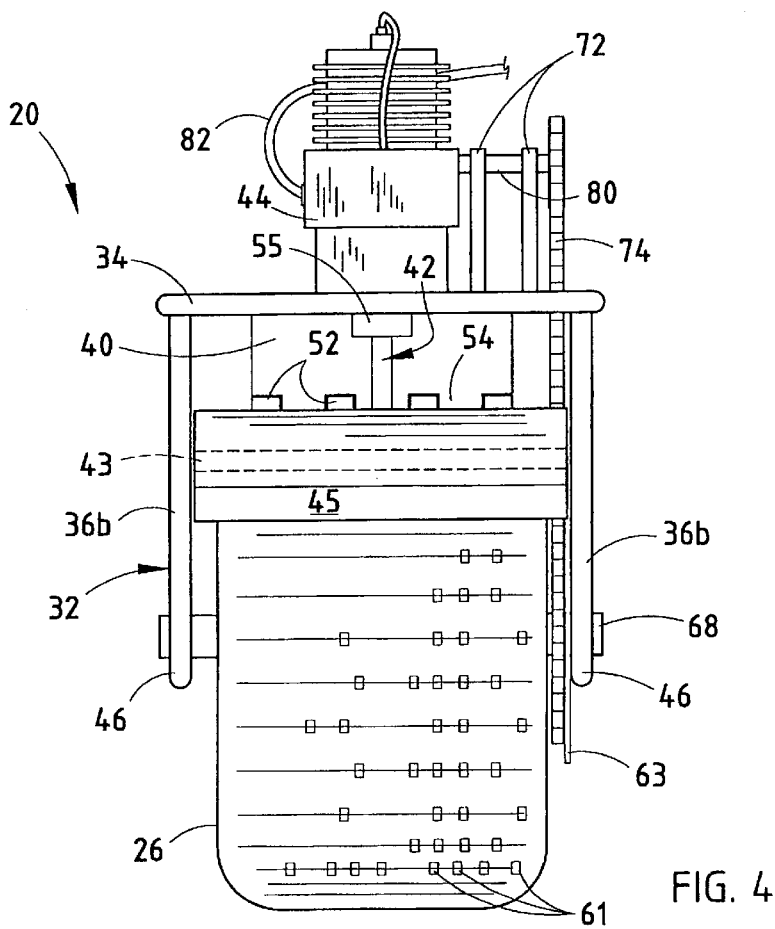
FIG. 4 is a rear, elevational view of the ice shanty mover of FIG. 2.

Ice shanty 22 includes a frame 32 made up of a top platform 34, a pair of side supports 36a, b extending downwardly from each side of top platform 34, a hinge support 40, and an adjustment bar 42 (FIGS. 2–4). Side supports 36a, b extend downwardly from top platform 34 at an angle and meet at an axle support 46, which is disposed slightly rearwardly from top platform 34. A horizontal reinforcement beam 38 may be provided between side supports 36a and 36b to add additional strength and stability to frame 32. A rear cross bar 43 extends between side supports 36a on each side of ice shanty mover 20 and provides support for a tire cover 45 (FIG. 4). Tire cover 45 extends rearwardly over a portion of traction wheel 26 and functions in a similar manner to a fender.

Figure 8:
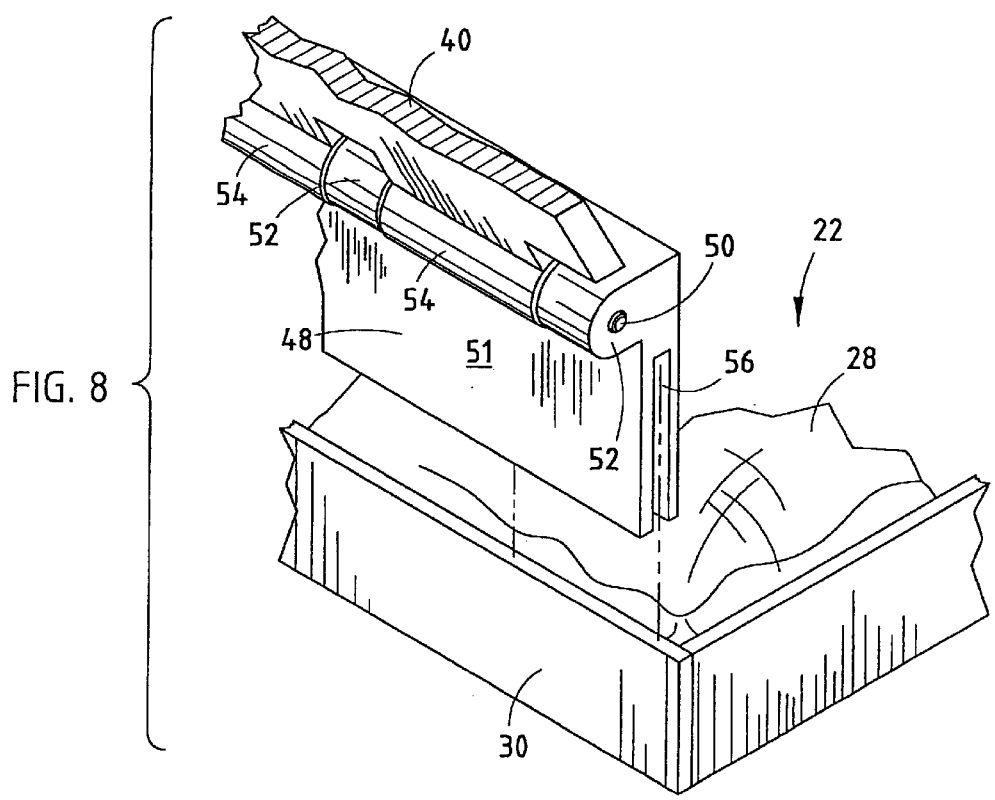
FIG. 8 is a perspective, fragmentary view of an ice shanty engaging plate on the ice shanty of FIG. 1.
Figure 9:
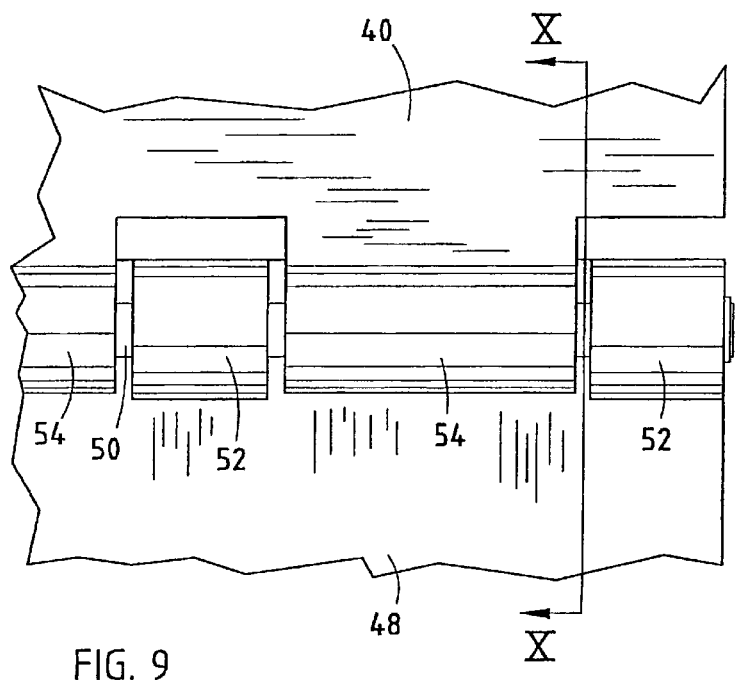
FIG. 9 is a fragmentary, rear elevational view of a hinge on the ice shanty engaging plate of FIG. 8.
Figure 10:
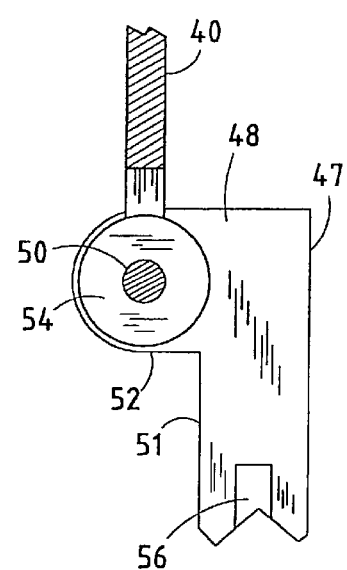
FIG. 10 is a sectional view taken along the line X—X of FIG. 9.

Hinge support 40 extends forwardly at an angle from the bottom side of top platform 34. Hinge support 40 includes a plurality of cylindrical projections 54 through which a transverse bore is defined (FIGS. 8–10). A pivot pin 50 is inserted through the transverse bore defined in cylindrical projections 54. Pivot pin 50 also passes through a transverse bore defined in a plurality of upper projections 52 on front plate 48. Upper projections 52 and cylindrical projections 54 are configured to fit together like teeth such that pivot pin 50 can be inserted through their transverse bores. Front plate 48 and hinge support 40 are thus hingedly connected such that front plate 48 is free to swing about an axis defined by pivot pin 50. Front plate 48 generally defines a recess 56 extending upward from the bottom of front plate 48. Recess 56 is dimensioned to receive a portion of the skirt 30 surrounding tent structure 28 on ice shanty 22. By inserting skirt 30 into recess 56, ice shanty mover 20 securely and firmly engages ice shanty 22 while it pushes ice shanty 22. Alternatively, a front surface 47 of front plate 48 can be positioned behind skirt 30 to simply push ice shanty 22 if skirt 30 is too large to fit into recess 56.

Front plate 48 is pivotally attached to adjustment bar 42 by way of a pivot mount 49 attached to a back surface of front plate 48 (FIG. 2). Pivot mount 49 includes a pin 53 inserted through concentric bores defined in pivot mount 49 and one end of adjustment bar 42, respectively. Adjustment bar 42 comprises an inner beam 58 and an outer beam 60. Outer beam 60 includes a hollow interior dimensioned sufficiently large to receive inner beam 58. Outer beam 60 is pivotally attached to front plate 48. Inner beam 58 is pivotally attached to the underside of top platform 34. Inner beam 58 is pivotally attached to top platform 34 by way of a pivot mount 55 through which a pin 57 is inserted. Pin 57 is inserted in an aperture defined on the upper end of inner beam 58. Inner beam 58 extends into the hollow interior of outer beam 60 a sufficient distance to allow adjustments to be made to the length of adjustment bar 42. Length adjustments to adjustment bar 42 are accomplished by a locking pin 59 which is selectively insertable through a plurality of adjustment holes 62 defined on inner and outer beams 58 and 60. By selectively aligning adjustment hole 62 on inner beam 58 with a selected adjustment hole defined on outer beam 60, and then inserting locking pin 59 therethrough, the length of adjustment bar 42 can be varied as desired. By varying the length of adjustment bar 42, ice shanty mover 20 can be used with a variety of different ice shanties 22 having skirts 30 of varying height. Furthermore, adjustment bar 42 can be adjusted to alter the height of traction wheel 26 to accommodate varying depths and wetness of snow. Also, adjustment bar 42 can be used to lift traction wheel 26 off of the ground when ice shanty 20 is not in use.

Traction wheel 26 is rotatably mounted on an axle 68 supported by axle supports 46 (FIGS. 1–4). Traction wheel 26 can be any variety of types of wheels. As but some examples, traction wheel 26 could be a small automobile snow tire, a tractor wheel, a tire with chains mounted on it, a cleated wheel, or any other type of wheel which provides traction on snowy and icy surfaces. Also, to provide even more traction, it is contemplated that two or more traction wheels 26 could be used on ice shanty mover 20. Such a plurality of wheels would all be mounted on axle 68 which would be lengthened accordingly. The additional wheels would provide additional surface area contacting the ground, and thereby increase the traction of ice shanty mover 20. In the illustrated embodiment, traction wheel 26 includes a plurality of cleats 61 disposed around the periphery of traction wheel 26. A drive gear 76 is mounted around axle 68 in any conventional manner such that the rotation of drive gear 76 will cause traction wheel 26 to rotate. Drive gear 76 is rotated by a chain 74 which is ultimately powered by motor 44 in a manner described below. In the illustrated embodiment, a chain guard 63 is also mounted around axle 68 on a side of drive gear 76 opposite traction wheel 26 (FIG. 4). Chain guard 63 serves to prevent a user's clothing or other loose items from becoming entangled with drive gear 76 and chain 74.

A chain 74 connects drive gear 76 to a secondary gear 70 mounted on top platform 34. Chain 74 passes through an elongated opening 77 defined in top platform 34. Secondary gear 70 is rotatably mounted on an axle 80 supported by a pair of supports 72 attached to the top surface of top platform 34. Secondary gear 70 is mounted at one end of axle 80. On an opposite end of axle 80, a first gear 66 is mounted. First gear is connected to motor 44 by way of a power chain 75. When motor 44 is activated, power chain 75 rotates first gear 66 which in turn causes secondary gear 70 to rotate. The rotation of secondary gear 70 causes chain 74 to rotate traction wheel 26 in the direction illustrated in FIG. 2, which in turn causes ice shanty mover 20 to move. The diameters of secondary gear 70, first gear 66, and drive gear 76 can all be adjusted as desired to deliver the appropriate speed, power, and torque to traction wheel 26. In the illustrated embodiment, secondary gear 70 has a smaller diameter than first gear 66 which reduces the ratio between the number of revolutions of traction wheel 26 and motor 44. Increasing the diameter of gear 70 would further reduce the number of revolutions of traction wheel 26 per revolution of motor 44.

In the preferred embodiment, motor 44 includes a conventional torque engaging clutch such that power chain 75 is not activated unless motor 44 achieves a certain minimum number of revolutions per minute. In this manner, ice shanty mover 20 will not move while motor 44 is running unless the speed of motor 44 has been increased by the user as described below. Motor 44 can be a motor of any size provided it is capable of delivering sufficient power to push a shanty. A two cylinder motor, such as from a conventional chainsaw, is believed to be sufficient. Other types of motors can, of course, be used, such as a battery powered electric motor, among other examples.

Figure 5:
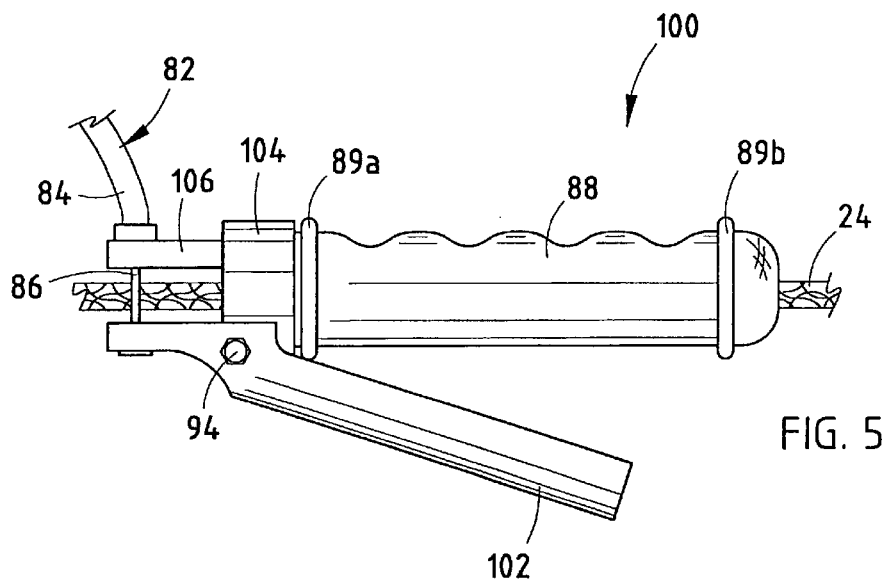
FIG. 5 is a plan view of a handle and control switch illustrated in a first position.
Figure 6:
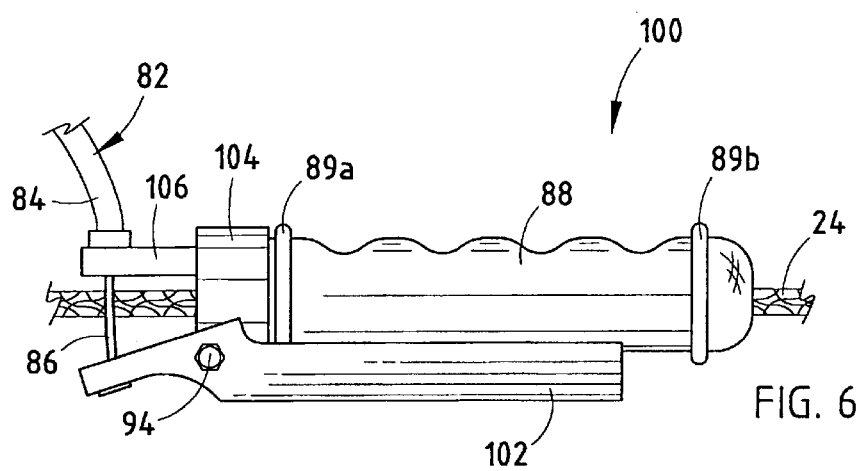
FIG. 6 is a plan view of a handle and control switch of FIG. 5 illustrated in a second position.
Figure 7:
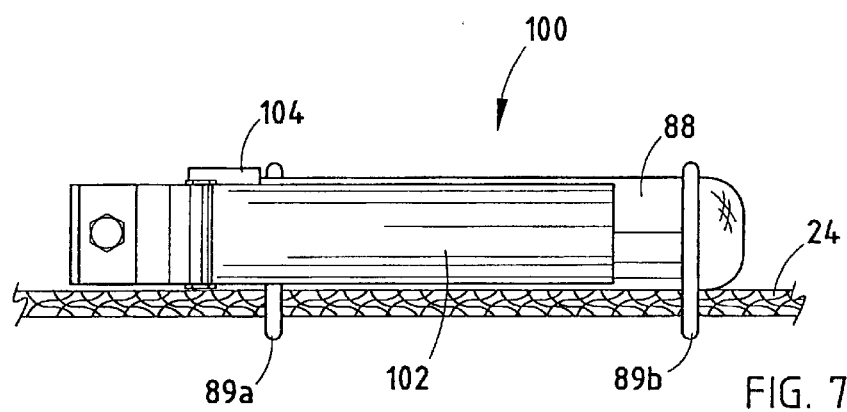
FIG. 7 is a side, elevational view of the handle and control switch of FIG. 5.

The speed of motor 44 is controlled by a control switch 100 mounted on a handle 88 (FIGS. 5–7). Control switch 100 is attached to a throttle or control cable 82 which is in turn attached to motor 44. Throttle cable 82 includes an outer sleeve 84 and an internal cable 86 which is movable inside of outer sleeve 84. Control switch 100 comprises a control bar 102 which is pivotably attached to a ring or sleeve 104 mounted around handle 88. An extension bar 106 extends outwardly from ring 104 and provides a place for mounting throttle cable 82. Outer sleeve 84 of throttle cable 82 is mounted to extension bar 106. Extension bar 106 includes an aperture (not shown) through which internal cable 86 passes. Internal cable 86 extends through another aperture defined in control bar 102 and is mounted on an opposite side to control bar 102. Control bar 102 is pivotable about a pivot axis 94 defined by a pivot pin rotatably secured to ring 104 in any conventional manner. The squeezing of control bar 102 toward handle 88 (FIG. 6) causes internal cable 86 to be moved through outer sleeve 84. The movement of internal cable 86 with respect to outer sleeve 84 controls the speed of motor 44. When control bar 102 is in a relaxed position (FIG. 5), the speed of motor 44 is not sufficient to activate the torque engaging clutch. In this manner, control switch 100 effectively acts as a deadman's switch. In other words, only by squeezing control bar 102 toward handle 88 will ice shanty mover 20 begin to move. If a user of ice shanty mover 20 slips or falls, or otherwise loses his or her grip on handle 88, control bar 102 will return to its relaxed position thereby causing ice shanty mover 20 to stop moving. Control switch 100 thus acts as a safety switch to prevent ice shanty mover 20 from pushing an ice shanty 22 into the user who is walking in front of the ice shanty. It is contemplated that control switch 100 can assume a variety of different configurations from that illustrated. As but one example, control switch 100 could take the form of a button that must be pushed to increase the speed of motor 44 such that the torque engaging clutch is activated. Alternatively, control switch 100 could be completely separate from handle 88.

Handle 88, in the illustrated embodiment, is secured to tow cables 24 by a pair of rings 89a and b attached to opposite sides of handle 88. Rings 89 have a larger diameter than the diameter of handle 88 such that rope 24 can be threaded through them. The diameter of rings 89a and b, however, is small enough such that rope 24 preferably is gripped securely enough such that handle 88 does not slide on rope 24.

In the illustrated embodiment, the steering of ice shanty 22 as it moves is accomplished by a tow cable or rope 24 which is attached to ice shanty 22. In an alternative embodiment, tow cable 24 can be attached directly to ice shanty mover 20. In such an alternative embodiment, it is preferred that tow cable 24 is attached to opposite ends of axle 68. In either embodiment, the pulling of tow cable 24 either right or left will enable the user to steer ice shanty 22 as it is moved across the ice.

Control cable 82 is sufficiently long to extend from motor 44 to the front of ice shanty 22. In the illustrated embodiment, control cable 82 extends underneath a pair of cable guides 108a and 108b attached to skirt 30 of ice shanty 22. Such an arrangement requires attachment of cable guides to ice shanty 22, which may be undesirable. As an alternative, therefore, cable 82 can simply be draped over tent structure 28 of ice shanty 22 and attached to handle 88. Alternatively, cable 82 could be replaced by a rigid arm that extends over tent structure 28 and includes a handle and switch for controlling ice shanty mover 20.

In the preferred embodiment, ice shanty mover 20 includes a cover 110 which conceals first gear 66 and second gear 70 (FIG. 1). Cover 110 provides protection against loose clothing becoming entangled with these gears and chains 74 and 75. Cover 110 is illustrated in phantom in FIG. 3. Cover 100 also serves to prevent control cable 82 from becoming entangled with first gear 66 and second gear 70. Cover 100 includes a front flange 112 and rear flange 114. Front and rear flanges 112 and 114 lie flat against top platform 34 and define a series of attachment apertures 116 (FIG. 3). Attachment apertures 116 allow screws or other fasteners to be inserted therethrough and secure cover 110 to top platform 34. It will of course be understood that cover 110 can assume a variety of different shapes and configurations other than that illustrated in FIGS. 1 and 3.

While the present invention has been described in terms of the preferred embodiments discussed in the specification, in will be understood by one skilled in the art that the present invention is not limited to these particular preferred embodiments, but includes any and all such modifications that are within the spirit and scope of the present invention as defined in the appended claims.

The embodiments of the present invention in which an exclusive property or privilege is claimed are defined as follows:

1. An ice shanty mover, comprising:
   a motor;
   a traction wheel;
   a frame on which said motor and said traction wheel are mounted;
   a chain connecting said motor to said traction wheel; and
   a control cable attached to said motor at a first end and attached to a hand grip at a second end, said control cable being of sufficient length to extend from a back side of an ice shanty to a front side of the ice shanty;
   a control switch attached to said hand grip and adapted to control the speed of said motor; and
   an ice shanty engaging plate having at least one vertically oriented, generally flat surface adapted to selectively abut against said ice shanty and push said ice shanty when said traction wheel rotates, said ice shanty engaging plate having a first end mounted to said frame and a second end opposite said first end which is free.

2. The ice shanty mover of claim 1 wherein said motor includes a torque engaging clutch, said torque engaging clutch adapted to cause said chain to move only after said motor exceeds a certain number of revolutions per minute.

3. The ice shanty mover of claim 1 further including a ratio reducing gear disposed between said motor and said traction wheel, said ratio reducing gear adapted to reduce the ratio between the number of revolutions of said traction wheel and said motor.

4. The ice shanty mover of claim 1 further including a second traction wheel disposed adjacent the first traction wheel.

5. The ice shanty mover of claim 1 wherein said control switch is adapted to stop said motor when said control switch is not depressed.

6. The ice shanty mover of claim 1 further including a hinge attached to said frame and said ice shanty engaging plate and a recess defined in said plate dimensioned to receive a skirt portion on the ice shanty.

7. The ice shanty mover of claim 6 wherein said frame is pivotable about said hinge.

8. The ice shanty mover of claim 1 further including a cover attached to said frame, said cover disposed above said traction wheel.

9. The ice shanty mover of claim 1 wherein said traction wheel is a tire.

10. The ice shanty mover of claim 7 further including an adjustment bar whereby the pivoting of said frame about said hinge can be selectively locked in different pivot positions.

11. An ice shanty mover, comprising:
    a frame having a front and a rear end;
    a traction wheel rotatably mounted on said rear end of said frame;
    a motor mounted on said frame that rotates said traction wheel;
    a hinge pivotally mounted about a horizontal axis to said front end of said frame, said hinge having a first end mounted to said frame and a second end opposite said first end which is free, said free end defining a recess dimensioned to receive a portion of a skirt on the ice shanty whereby rotation of said traction wheel pushes said hinge against the skirt of the shanty and thereby moves the shanty.

12. The ice shanty mover of claim 11 further including at least one steering cable mounted to said frame, said steering cable mounted to opposite sides of said frame and having sufficient length to extend around the ice shanty.

13. The ice shanty mover of claim 11 further including at least one control cable having first and second ends, said first end mounted to said motor, said second end mounted to a controller, said controller adapted to control the speed of said motor, said control cable being of sufficient length to extend from a back side of an ice shanty to a front side.

14. The ice shanty mover of claim 13 further including a locking mechanism disposed between said frame and said hinge, said locking mechanism adapted to allow said hinge to be locked in different angular pivot positions relative to said frame.

15. The ice shanty mover of claim 14 wherein said motor includes a torque engaging clutch adapted to rotate said traction wheel only when said motor exceeds a certain rotational speed.

16. An ice shanty mover, comprising:
   a frame having a top board and a pair of downwardly extending parallel support bars;
   an axis rotatably mounted between said pair of parallel support bars;
   a traction wheel mounted to said axis;
   a motor mounted on said top board, said motor including a torque engaging clutch that causes rotation of a gear attached to said motor only after said motor has achieved a certain minimum number of revolutions per minute;
   a chain attached to said gear and to said traction wheel such that rotation of said gear causes rotation of said traction wheel; and
   a front, vertical plate having at least one generally flat surface adapted to engage an ice shanty and push said ice shanty when said traction wheel rotates said plate having a first end mounted to said frame and a second end opposite said first end which is free.

17. The ice shanty mover of claim 16 wherein said front plate is hingedly attached to said frame.

18. The ice shanty mover of claim 16 further including at least one control cable having first and second ends, said first end mounted to said motor, said second end mounted to a controller adapted to control the speed of said motor, said control cable being of sufficient length to extend from a back side of an ice shanty to a front side of the ice shanty.

19. The ice shanty mover of claim 18 wherein said controller includes a safety switch that must be activated at all times in order to have said motor turn said traction wheel.

20. The ice shanty mover of claim 19 wherein said vertical front plate is pivotally attached to said frame, and said ice shanty mover includes a locking mechanism for locking said front plate in different pivoted positions relative to said frame.

* * * * *